(12) United States Patent
Fielder et al.

(10) Patent No.: US 9,777,176 B2
(45) Date of Patent: Oct. 3, 2017

(54) METHOD OF EJECTING FLUID DROPLETS FROM THERMAL INKJET DEVICE

(71) Applicant: Memjet Technology Limited, Dublin (IE)

(72) Inventors: Simon Fielder, North Ryde (AU); Michele Gimona, North Ryde (AU); Christopher Barton, North Ryde (AU)

(73) Assignee: Memjet Technology Limited (IE)

( * ) Notice: Subject to any disclaimer, the term of this patent is extended or adjusted under 35 U.S.C. 154(b) by 0 days.

(21) Appl. No.: 15/233,531

(22) Filed: Aug. 10, 2016

(65) Prior Publication Data

US 2016/0347964 A1 Dec. 1, 2016

Related U.S. Application Data

(63) Continuation of application No. 14/310,298, filed on Jun. 20, 2014, now Pat. No. 9,422,441.

(60) Provisional application No. 61/844,276, filed on Jul. 9, 2013.

(51) Int. Cl.
| | |
|---|---|
| *C09D 11/328* | (2014.01) |
| *C09D 11/38* | (2014.01) |
| *C08K 5/23* | (2006.01) |
| *C08K 5/06* | (2006.01) |
| *B41J 2/14* | (2006.01) |

(52) U.S. Cl.
CPC ........... *C09D 11/38* (2013.01); *B41J 2/14016* (2013.01); *C08K 5/06* (2013.01); *C08K 5/235* (2013.01); *C09D 11/328* (2013.01)

(58) Field of Classification Search
CPC ........ C09D 11/30; C09D 11/328; C09D 11/38
See application file for complete search history.

(56) References Cited

U.S. PATENT DOCUMENTS

| | | | |
|---|---|---|---|
| 5,196,057 A | 3/1993 | Escano et al. | |
| 5,356,464 A | 10/1994 | Hickman et al. | |
| 5,709,737 A | 1/1998 | Malhotra et al. | |
| 6,660,072 B2 * | 12/2003 | Chatterjee | C09D 11/38 |
| | | | 106/31.43 |
| 2003/0089274 A1 | 5/2003 | Nishita et al. | |
| 2004/0179077 A1 | 9/2004 | Samii et al. | |
| 2006/0109324 A1 | 5/2006 | Fujimoto et al. | |
| 2007/0157849 A1 * | 7/2007 | Kluge | D06P 5/30 |
| | | | 106/31.33 |

(Continued)

FOREIGN PATENT DOCUMENTS

| | | |
|---|---|---|
| DE | 10345801 A1 | 4/2005 |
| EP | 2390290 A1 | 11/2011 |

(Continued)

OTHER PUBLICATIONS

International Search Report for PCT/EP2014/063461 issued Jul. 24, 2014, 10 pages.

*Primary Examiner* — Veronica F Faison
(74) *Attorney, Agent, or Firm* — Cooley LLP

(57) ABSTRACT

A method of printing from an inkjet nozzle device having a thermal actuator. The method includes the steps of supplying a fluid to the inkjet nozzle device, the fluid comprising an acetylenic compound; and repeatedly actuating the thermal actuator so as to eject fluid droplets from a nozzle opening of the inkjet nozzle device. The acetylenic compound is present in an amount sufficient to increase the lifetime of the inkjet nozzle device.

10 Claims, 3 Drawing Sheets

(56) References Cited

U.S. PATENT DOCUMENTS

2008/0146713 A1  6/2008  Yatake et al.

FOREIGN PATENT DOCUMENTS

| EP | 2479222 A1 | 11/2012 |
| WO | 2012151630 A1 | 11/2012 |

* cited by examiner

METHOD OF EJECTING FLUID DROPLETS FROM THERMAL INKJET DEVICE

CROSS-REFERENCE TO RELATED APPLICATIONS

This application is a continuation of U.S. patent application Ser. No. 14/310,298, entitled "INK FOR IMPROVING PRINTHEAD LIFETIME," filed on Jun. 20, 2014, which claims priority to and the benefit of U.S. Provisional Patent Application No. 61/844,276, entitled "INK FOR IMPROVING PRINTHEAD LIFETIME," filed Jul. 9, 2013, the disclosures of each of which are incorporated herein by reference in their entirety.

FIELD OF THE INVENTION

This invention relates to an inkjet ink. It has been developed primarily for improving the lifetime of printheads, and particularly the Applicant's Memjet® printheads.

BACKGROUND OF THE INVENTION

The present Applicant has developed a plethora of high-speed inkjet printers employing stationary Memjet® printheads which extend across a media width. By contrast, virtually all other types of inkjet printer utilize a scanning printhead which traverses across the media width.

High-speed pagewidth printing necessarily places additional demands on the design of the printhead compared to traditional types of inkjet printhead. The nozzle devices must have a self-cooling design, high ink refill rates and high thermal efficiency. To this end, the Applicant has developed a range of thermal bubble-forming printheads, including those with suspended resistive heater elements (as described in, for example, U.S. Pat. No. 6,755,509; U.S. Pat. No. 7,246,886; U.S. Pat. No. 7,401,910; and U.S. Pat. No. 7,658,977, the contents of which are incorporated herein by reference) and those with embedded ("bonded") resistive heater elements (as described in, for example, U.S. Pat. No. 7,377,623; U.S. Pat. No. 7,431,431; U.S. 2006/250453; and U.S. Pat. No. 7,491,911, the contents of which are incorporated herein by reference).

Nozzle devices having suspended heater elements offer the advantages of efficient heat transfer from the heater element to the ink and self-cooling characteristics. However, they suffer from the disadvantage of relatively short printhead lifetimes, because suspended heater elements are typically less robust than their bonded counterparts.

One approach to improving printhead lifetime is to coat the heater elements with a layer of protective coating. For example, U.S. Pat. No. 6,719,406 (assigned to the present Applicant) describes suspended heater elements having a conformal protective coating, which improves the robustness of the heater element and improves printhead lifetime. However, protective coatings are undesirable for a number of reasons—they reduce the efficiency of heat transfer from the resistive heater elements to the surrounding ink; they consequently affect the self-cooling characteristics; and they introduce additional MEMS fabrication challenges.

Therefore, it is generally preferable to employ uncoated ("naked") heater elements in Memjet® printheads with a consequential reduction in printhead lifetime. To some extent, the choice of heater material can mitigate the effects of using uncoated heater elements. For example, U.S. Pat. No. 7,431,431 describes the use of a self-passivating titanium aluminium nitride heater element, which has improved lifetime compared to more conventional materials used in the art. Nevertheless, there is still a need to improve the lifetimes of Memjet® printheads, and particularly those employing uncoated heater elements.

It has been found that certain inks are particularly aggressive towards heater elements. For example, many dye-based inks have been found to corrode heater elements resulting in shortened printhead lifetimes. In a multi-color printhead (e.g. CMYK), the printhead lifetime is, to a large extent, limited by the lifetime of the color channel having the shortest lifetime. If, for example, a black dye-based ink is found to be particularly corrosive towards heater elements, then the lifetime of the printhead will be determined by the lifetime of the black channel, even if all other color channels still perform well when the black color channel fails.

In the present context, "failure" of a nozzle device means any change in drop ejection characteristics which results in unacceptable print quality. For example, failure may be invoked by a reduction in drop velocity, poor drop directionality or non-ejection of ink. Moreover, the criteria for failure may be different for different colors. For example, a reduction in print quality in a yellow channel may be more tolerable than a corresponding reduction in print quality in a black channel, because black ink is more visible to the human eye (i.e. black ink has a higher luminance on white paper). This, in combination with the aggressive nature of many black dyes, means that the black channel in a Memjet® printhead is typically the limiting color channel in terms of printhead lifetime.

It would be desirable to improve the lifetime of printheads employing resistive heater elements. It would be further desirable to improve the lifetime of such printheads without modifying the design of the printhead.

US 2004/0179077 describes the use of, inter alia, Surfynol® surfactants for inhibiting corrosion of glass structures in nozzle chambers of inkjet printheads.

U.S. Pat. No. 6,660,072 describes the use of various acetylenic alcohols for inhibiting corrosion of steel components in the ink delivery path of an inkjet printer. Only acetylenic alcohols having a terminal acetylene and an α-hydroxy group were found to be effective in inhibiting corrosion.

U.S. Pat. No. 5,709,737 describes, inter alia, symmetric acetylenic bisalkoxy alcohols as anti-curling agents in inkjet inks which are subjected to microwave drying after printing. Inks containing a plethora of anti-curling agents in amounts ranging from about 5 to 20 wt. % are exemplified. The skilled person will appreciate that ethoxylated anti-curling agents should be added to inks in an amount of at least about 10 wt. % in order to provide effective anti-curling characteristics (see, for example, U.S. Pat. No. 5,356,464, column 9, lines 3 to 9). Generally, the art is prejudiced against employing additives in amounts which increase the overall toxicity of ink. Since anti-curling agents must be added at relatively high concentrations in order to be effective, low toxicity anti-curling agents are ubiquitous in commercial ink formulations.

SUMMARY OF THE INVENTION

In a first aspect, there is provided an inkjet ink comprising:
    an ink vehicle;
    a colorant; and
    an acetylenic compound having an alkoxylated hydroxyl group, wherein the hydroxyl group is a primary or secondary hydroxyl group and the acetylenic compound is absent a lipophilic group.

Inks according to the first aspect exhibit a significant improvement in printhead lifetimes compared with similar inks lacking the acetylenic compound. Typically, a printhead lifetime improvement of at least 25%, at least 50%, at least 100%, at least 200% or at least 300% may be achievable by employing ink according to the first aspect. Furthermore, inks according to the first aspect exhibit minimal deleterious effects on print quality over the lifetime of the printhead. Furthermore, inks according to the first aspect have a minimal impact on refill rates of nozzle chambers in the printhead, because the acetylenic compound has minimal or no surfactancy and, therefore, has minimal effect on the bulk surface tension of the ink. Essentially, an established balance of desirable ink characteristics is not significantly altered by the inclusion of the acetylenic compound in inkjet inks, whilst improving the longevity of nozzle devices in the printhead.

As used herein, the term "alkoxylated" generally refers to ethoxylated or propoxylated derivatives, although other forms of alkoxylation are, of course, within the ambit of the present invention. Generally, ethoxylated derivatives are preferred.

As used herein, the term "lipophilic group" generally refers to a terminal alkyl group having 4 or more carbon atoms (e.g. 4 to 30 carbon atoms). The terminal alkyl group may be straight or branched. Examples of lipophilic groups include isobutyl (as found in Surfynol® 440, Surfynol® 465, Surfynol® 480, Surfynol® 485 etc), nonyl (as found in Tergitol® NP-9), tetramethylbutyl (as found in Triton® X-100) etc. Lipophilic groups of this type are absent from the acetylenic compounds employed in the present invention.

Preferably, the acetylenic compound comprises at least one ethoxylated primary hydroxyl group. Typically, a pair of ethoxylated hydroxyalkyl groups flank a central acetylenic moiety.

Preferably, the acetylenic compound is of formula (A):

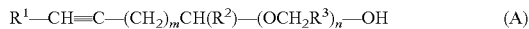

$$R^1-CH\!\equiv\!C-(CH_2)_m CH(R^2)-(OCH_2R^3)_n-OH \qquad (A)$$

wherein:
$R^1$ is selected from the group consisting of: H, $C_{1-3}$ alkyl; and $-(CH_2)_p CH(R^4)(R^5)$;
$R^2$ is selected from the group consisting of: H and $C_{1-3}$ alkyl;
$R^3$ is selected from the group consisting of: $-CH_2-$ and $-CH(CH_3)-$;
$R^4$ is selected from the group consisting of: H and $C_{1-3}$ alkyl;
$R^5$ is selected from the group consisting of: $-OH$ and $-(OCH_2R^3)_q-OH$;
m is 0, 1, 2 or 3;
n is 1 to 50;
p is 0, 1, 2 or 3; and
q is 1 to 50.

Preferably, $R^2$ and $R^4$ are both H. Primary ethoxylated hydroxyl groups are generally preferred for maximizing solubility in the ink vehicle.

Preferably, $R^3$ is $CH_2$, such that the acetylenic compound is an ethoxylated derivative.

Preferably, $R^1$ is $-(CH_2)_p CH(R^4)(R^5)$. Hence, the acetylenic compound is typically a mono-ethoxylated or bis-ethoxylated diol. Preferably, $R^5$ is $-(OCH_2CH_2)_q-OH$ in order to maximize the solvating characteristics of the acetylenic compound in the ink vehicle.

Preferably, m and p are both 0.

Preferably, n is 1 to 5 and q is 1 to 5. Preferably, n and q are both 1.

In general, the degree of alkoxylation (e.g. ethoxylation) may be varied in order to 'tune' the solubility and other characteristics (e.g. humectancy) of the acetylenic compound. For example, the degree of ethoxylation may be tuned according to a particular printhead, ink vehicle or print medium. Compounds having different degrees of ethoxylation will be familiar to the person skilled in the art, for example, from the Surfynol® range of surfactants.

Preferably, the acetylenic compound is of formula (B):

$$R^6-C\!\equiv\!C-(CH_2)(OCH_2CH_2)OH \qquad (B)$$

wherein:
$R^6$ is selected from the group consisting of: $-CH_2OH$ and $-CH_2(OCH_2CH_2)-OH$.

As discussed below, ethoxylated butynediol derivatives have been demonstrated to be particularly efficacious in improving printhead lifetimes. The acetylenic compound may be a mono-ethoxylated butynediol derivative, a bis-ethoxylated butynediol derivative or mixtures thereof. A preferred acetylenic compound employed in the present invention is 1,4-bis(2-hydroxyethoxy)-2-butyne).

Preferably, the acetylenic compound is present in an amount ranging from 0.01 to 15 wt. %, preferably 0.1 to 2.5 wt. % or preferably 0.5 to 1.5 wt. %. Typically, about 1 wt. % of the acetylenic compound is sufficient to extend the lifetime of the printhead significantly.

The colorant may be a dye or pigment present in an amount ranging from 0.01 to 25 wt. %. Typically, the colorant is a dye, which may be corrosive towards inkjet resistive heater elements. Preferably, the colorant is present in an amount ranging from 0.01 to 10 wt. %, preferably 0.01 to 3 wt. %, preferably 0.1 to 2 wt. %, or preferably 0.2 to 1 wt. %.

Preferably, the ink vehicle comprises a balance of water. In other words, the inkjet inks according to the first aspect are typically aqueous-based inkjet inks. However, the present invention is not limited to aqueous inks and may be equally applicable to solvent-based inks, such as those described in U.S. Pat. No. 8,101,012, the contents of which are herein incorporated by reference.

Preferably, the ink vehicle comprises 5 to 50 wt. % of one or more co-solvents or preferably 10 to 40 wt. % of one or more co-solvents. The range of co-solvents is not particularly limited, and some suitable co-solvents for use in the present invention are described in more detail below. By way of example only, the ink vehicle may comprise one or more components selected from the group consisting of: 5 to 20 wt. % of ethylene glycol; 5 to 15 wt. % of 2-pyrrolidinone; 1 to 10 wt. % of glycerol; 1 to 5 wt. % of a $C_{1-6}$ alcohol; and 2 to 20 wt % of an oxyalkylene compound selected from the group consisting of: diethylene glycol, triethylene glycol, tetraethylene glycol and pentaethylene glycol.

Preferably, the ink vehicle comprises 0.05 to 2 wt % of at least one surfactant. Preferably, the ink vehicle comprises 0.1 to 1 wt % of surfactant. The range of surfactants is not particularly limited and some suitable surfactants for use in the present invention are described in more detail below. For example, the surfactant may be an anionic, cationic, nonionic or zwitterionic surfactant. Nonionic surfactants having an acetylenic moiety (e.g. the Surfynol® range of surfactants, available from Air Products and Chemicals, Inc.) may be preferred, because these surfactants have at least some effect in improving printhead longevity, albeit not the desired effect in the low surfactant quantities required for maintaining acceptable chamber refill rates.

In some embodiments, the ink may comprise an antioxidant, such as ascorbic acid. When present, the amount of antioxidant may be in the range of 0.01 to 5 wt. % or 0.1 to 3 wt. %.

In a second aspect, there is provided a method of improving a lifetime of an inkjet printhead, the method comprising the steps of:

supplying an ink as described above to nozzle chambers of the printhead, each nozzle chamber having an associated actuator in contact with the ink; and actuating one or more of the actuators to eject ink from the printhead.

The method according to second aspect dramatically improves printhead lifetimes compared to inks having none of the acetylenic compound described herein.

Preferably, each actuator comprises a resistive heater element, which superheats ink so as to form a bubble and eject ink from the corresponding nozzle chamber via a nozzle opening.

Preferably, the heater element is uncoated so that the ink is in direct contact with the resistive heater element.

Preferably, the heater element is comprised of a metal or a conductive ceramic material, such as a metal nitride. As used herein, the term "metal" includes metal alloys containing a plurality of different metals. Preferably, the heater element is comprised of a material selected from the group consisting of: a titanium alloy (e.g. titanium-aluminium alloy); titanium nitride; and a nitride of a titanium alloy (e.g. titanium aluminium nitride).

In a third aspect, there is provided an inkjet printer comprising:

an inkjet printhead having a plurality of nozzle chambers, each nozzle chamber having an associated actuator for contacting ink; and an ink reservoir in fluid communication with the nozzle chambers, the ink reservoir containing an ink as described above.

Preferred aspects of the printhead and ink will be readily apparent from the foregoing.

In a fourth aspect, there is provided a use of an ink as described herein for improving a lifetime of an inkjet printhead.

BRIEF DESCRIPTION OF THE DRAWINGS

Various embodiments of the present invention will now be described by way of example only with reference to the accompanying drawings, in which.

DETAILED DESCRIPTION OF THE INVENTION

Figure 1:
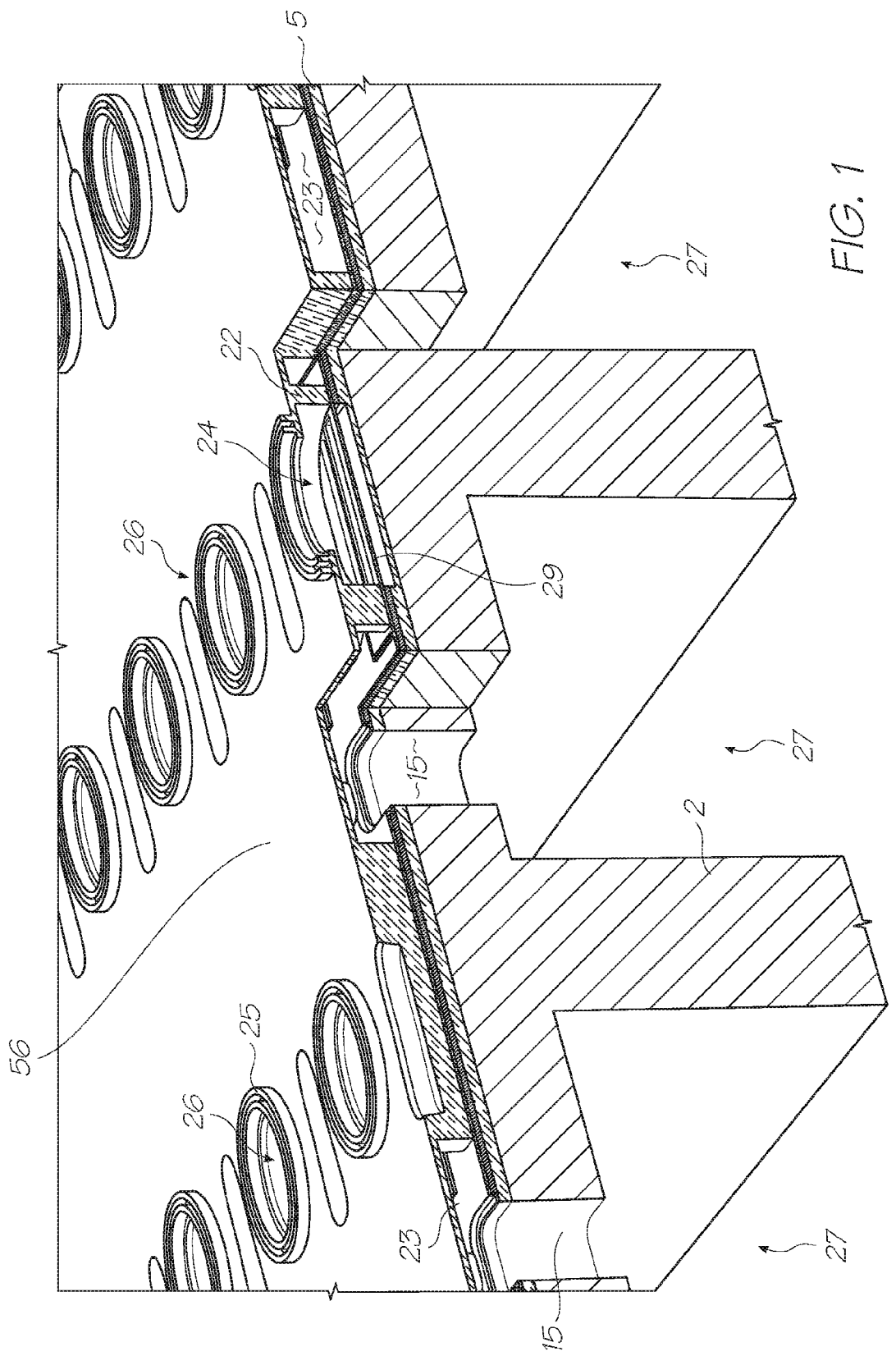
FIG. 1 is a perspective view of part of a thermal inkjet printhead.

The present inventors have sought a solution to the problem of improving printhead lifetime by investigating ink additives. As foreshadowed above, an ink additive is an attractive solution to this problem, because it does not require any modifications to the design of the printhead. However, the overwhelming majority of ink additives screened during extensive testing showed no improvement in printhead lifetime and, in many cases, had a negative effect on printhead lifetime. For example, the addition of alkylene diols, olefinic diols, inorganic salts, pH adjusters, amino compounds, tartaric acid etc to a standard black ink formulation had no effect in improving printhead lifetime and, in many cases, shortened printhead lifetime.

Nevertheless, during the course of this testing, it was found that increasing an amount of certain surfactants in the ink vehicle had a positive effect on printhead lifetime. Specifically, the Surfynol® range of surfactants exhibited a concentration dependence with printhead lifetime—the more surfactant added to the ink, the greater the printhead lifetime. Initially, it was believed that lowering the surface tension of the ink through increased surfactancy was responsible for this improvement. However, inkjet inks must be formulated within certain surface tension and viscosity parameters. With too much surfactant, the ink refill rate of nozzle chambers in the printhead becomes unacceptably slow. A typical inkjet ink has a surfactant concentration of less than about 2 wt. % and typically in the range of 0.1 to 1.5 wt. % in order to provide acceptable chamber refill rates. Unfortunately, the amount of surfactant required to improve printhead longevity was significantly higher than these acceptable ranges. Therefore, although printhead lifetime could be improved with the addition relatively high amounts of surfactant, print quality was severely compromised due to relatively slow chamber refill rates.

Furthermore, the situation was exacerbated because, for the reasons explained in U.S. application Ser. No. 13/615,127 ("Printer for minimizing adverse mixing of high and low luminance inks at nozzle face of inkjet printhead", filed on Sep. 13, 2012, the contents of which are herein incorporated by reference), it is especially desirable to have relatively low amounts of surfactant in black ink (e.g. 0.1 to 0.8 wt. % surfactant) in order to avoid adverse color mixing on the nozzle face of the printhead. Ironically, black inks tend to be the most problematic in terms of printhead lifetime.

However, the present inventors then considered whether or not the surfactant properties of the Surfynol® surfactants were actually responsible for the observed improvement in printhead lifetime. The Surfynol® range of surfactants have the common characteristic of a central acetylenic moiety flanked by a pair of branched alkyl groups, each having an ethoxylated tertiary alcohol group. The branched alkyl groups provide the lipophilic component of the surfactant molecule and the ethoxylated tertiary alcohol provides the hydrophilic component of the surfactant molecule, while the central acetylenic moiety merely provides some conformational stability.

Based on the idea that the acetylenic moiety, rather than the surfactant properties, was having an effect in improving printhead lifetime, the present inventors investigated a range of alternative acetylenic compounds having little or no surfactancy.

Accordingly, butynediol was investigated as a potential non-surfactant ink additive for improving printhead lifetime. Butynediol was an attractive candidate, because it was already known for use in dye-based inkjet inks (see, for example, U.S. Pat. No. 4,259,675), albeit as an alternative to more conventional alkylene glycol co-solvents. Initial experiments with butynediol were encouraging and showed signs of improved printhead lifetime. However, the results were highly variable. In particular, inks spiked with 1 wt. % butynediol showed highly variable print quality throughout the duration of testing. Even in cases where the lifetime of a nozzle device was improved, print quality varied erratically throughout the lifetime of the device. Typically, print quality would become unacceptably poor for several million drop ejections and then apparently recover before deteriorating again. In other cases, butynediol-spiked inks did not show any lifetime improvement whatsoever and with consistently poor print quality compared to unspiked inks.

Forensic examination of the heater elements in these experiments showed that a varying degree of kogation was occurring using the butynediol-spiked inks. This kogation was not observed in the unspiked inks. In cases where the butynediol-spiked inks behaved consistently poorly, a kogation layer had built up in the heater element. Moreover, in cases where the nozzle device went through transient phases of good print quality and poor print quality, the appearance and disappearance of a kogate was strongly associated with these phases.

Regardless of the problems of poor print quality, the butynediol testing was encouraging insofar as an improvement in printhead lifetime could sometimes be achieved without raising the amount of surfactant present in the ink. Frustratingly, the problem of variable print quality using butynediol could not be solved via formulation changes. It appeared that the appearance and disappearance of the kogate was being determined by uncontrollable microscopic interactions between the butynediol and the heater element.

Acetylenic compounds are known to have a passivating effect on certain metal surfaces via a surface interaction and polymerization mechanism (albeit surfaces at ambient temperatures as opposed to surfaces which are rapidly heated and cooled inside a nozzle chamber of an inkjet printhead). This corrosion-inhibiting effect of acetylenes has been reported widely in the literature, typically in connection with inhibiting the corrosion of steel water-carrying pipelines (see, for example, "Acetylenic Corrosion Inhibitors", Foster et al., Ind. and Eng. Chem., 51, 825-8 (1959)). Indeed, U.S. Pat. No. 6,660,072 reports the use of inkjet inks containing compounds having a terminal acetylene and an alpha-hydroxy group for inhibiting the corrosion of steel components in an ink delivery system. However, unlike conventional inkjet nozzle devices, which employ a heater element passivated with an inert barrier layer (e.g. tantulum), Memjet® printheads employ uncoated heater elements to facilitate the self-cooling characteristics of nozzle devices required for pagewidth printing. From the butynediol experiments, it was hypothesized that the acetylenic compound was polymerizing on the heater element and forming the kogate. In some cases, the kogate was being "blasted off" by the heater element and dissolving back into the ink vehicle; in other cases, the kogate was more permanently adhering to the heater element and building up to the point where it severely affected print quality.

The present inventors further hypothesized that increasing the solubility of the acetylenic compound in the ink vehicle would have a positive effect in controlling the build up of kogate on the heater elements. Without wishing to be bound by theory, it is understood by the present inventors that a more soluble passivating layer on the heater elements would be less likely to form a permanent or thick layer of kogate, this kogate being responsible for a consequent deterioration in print quality. Accordingly, 1,4-bis(2-hydroxyethoxy)-2-butyne (commercially available under the tradename Butoxyne™ 497, supplied by Ashland, Inc.) was used to spike inks.

Remarkably, inks spiked with the ethoxylated butynediol showed consistent improvement in printhead lifetime with none of the poor print quality issues associated with butynediol-spiked inks. For example, a black ink, which typically causes failure of a Memjet® printhead at about 40-50 million drop ejections, showed at least a threefold improvement in printhead lifetime when spiked with 1 wt. % 1,4-bis(2-hydroxyethoxy)-2-butyne. Moreover, no issues of transient deterioration in print quality were observed. This is in contrast with non-ethoxylated acetylenic alcohols, which either improved printhead lifetime with transient periods of unacceptably poor print quality, or failed to improve printhead lifetime at all.

Some batch variability of ethoxylated butynediol was observed. It was found that this batch variability could be ameliorated by adding small quantities of ascorbic acid to ink formulations. Thus, apparently inactive batches of ethoxylated butynediol provided excellent improvements in printhead lifetime once the formulated inks had been spiked with ascorbic acid. Without wishing to be bound by theory, it is believed that trace quantities of peroxide, sometimes used in the purification of ethoxylated butynediols, was responsible for apparently inactive inks formulated from certain batches of ethoxylated butynediol. It was further believed that the addition of ascorbic acid neutralized the effects of trace peroxide and rendered these inks active with respect to printhead lifetime improvement.

It will be appreciated that the acetylenic compounds described herein, such as ethoxylated butynediols, may be employed in a range of inkjet inks for improving printhead lifetime.

Colorants, ink vehicles and printheads suitable for use in connection with the present invention are described in further detail below.

Colorants

The inks utilized in the present invention may be dye-based or pigment-based.

Inkjet dyes will be well-known to the person skilled in the art and the present invention is not limited to any particular type of dye. By way of example, dyes suitable for use in the present invention include include azo dyes (e.g. Food Black 2), metal complex dyes, naphthol dyes, anthraquinone dyes, indigo dyes, carbonium dyes, quinone-imine dyes, xanthene dyes, cyanine dyes, quinoline dyes, nitro dyes, nitroso dyes, benzoquinone dyes, naphthoquinone dyes, phthalocyanine dyes (including naphthalocyanine dyes), and metal phthalocyanine dyes (including metal naphthalocyanine dyes, such as those described in U.S. Pat. No. 7,148,345, the contents of which is herein incorporated by reference).

Examples of suitable dyes include: CI Direct Black 4, 9, 11, 17, 19, 22, 32, 80, 151, 154, 168, 171, 194 and 195; CI Direct Blue 1, 2, 6, 8, 22, 34, 70, 71, 76, 78, 86, 142, 199, 200, 201, 202, 203, 207, 218, 236 and 287; CI Direct Red 1, 2, 4, 8, 9, 11, 13, 15, 20, 28, 31, 33, 37, 39, 51, 59, 62, 63, 73, 75, 80, 81, 83, 87, 90, 94, 95, 99, 101, 110, 189, 225 and 227; CI Direct Yellow 1, 2, 4, 8, 11, 12, 26, 27, 28, 33, 34, 41, 44, 48, 86, 87, 88, 132, 135, 142 and 144; CI Food Black 1 and 2; CI Acid Black 1, 2, 7, 16, 24, 26, 28, 31, 48, 52, 63, 107, 112, 118, 119, 121, 172, 194 and 208; CI Acid Blue 1, 7, 9, 15, 22, 23, 27, 29, 40, 43, 55, 59, 62, 78, 80, 81, 90, 102, 104, 111, 185 and 254; CI Acid Yellow 1, 3, 4, 7, 11, 12, 13, 14, 19, 23, 25, 34, 38, 41, 42, 44, 53, 55, 61, 71, 76 and 79; CI Reactive Blue 1, 2, 3, 4, 5, 6, 7, 8, 9, 13, 14, 15, 17, 18, 19, 20, 21, 25, 26, 27, 28, 29, 31, 32, 33, 34, 37, 38, 39, 40, 41, 43, 44 and 46; CI Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 44, 45, 46, 49, 50, 58, 59, 63, 64, and 180; CI Reactive Yellow 1, 2, 3, 4, 6 7, 11, 12, 13, 14, 15, 16, 17, 18, 22, 23, 24, 25, 26, 27, 37 and 42; CI Reactive Black 1, 3, 4, 5, 6, 8, 9, 10, 12, 13, 14 and 18; Pro-Jet® Fast Cyan 2 (Fujifilm Imaging Colorants); Pro-Jet® Fast Magenta 2 (Fujifilm Imaging Colorants); Pro-Jet®

Fast Yellow 2 (Fujifilm Imaging Colorants); and Pro-Jet® Fast Black 2 (Fujifilm Imaging Colorants).

Conventional pigments suitable for use in the present invention may be inorganic pigments or organic pigments. Examples of conventional pigments are carbon black, Cadmium Red, Molybdenum Red, Chrome Yellow, Cadmium Yellow, Titan Yellow, chromium oxide, Viridian, Titan Cobalt Green, Ultramarine Blue, Prussian Blue, Cobalt Blue, diketopyrrolo-pyrrole, anthraquinone, benzimidazolone, anthrapyrimidine, azo pigments, phthalocyanine pigments (including naphthlocyanine pigments), uinacridone pigments, isoindolinone pigments, dioxazine pigments, indanthrene pigments, perylene pigments, perinone pigments, thioindigo pigments, quinophthalone pigments, and metal complex pigments.

Examples of suitable pigments include: Cyan COJ450 (Cabot), D71C and D75C (Diamond Dispersions); Magenta COJ465 (Cabot), D71M, D75M, D71PV19 (Diamond Dispersions), Hostajet Magenta E-PT VP2690 and Hostajet Magenta E5B-PT VP3565 (Clariant); Yellow COJ270 and COJ470 (Cabot), or D71Y, D71Y155, D75Y (Diamond Dispersions) and Hostajet Yellow 4G-PT VP2669 (Clariant); Black CW1, CW2, CW3 (Orient) or COJ200, COJ300, COJ400 (Cabot) or SDP1000, SDP2000 (Sensient), or D71K, D75K, D77K, D80K (Diamond Dispersions) and Hostajet Black O-PT (Clariant); Red D71R (Diamond Dispersions); Blue D71B (Diamond Dispersions).

The pigments may be self-dispersing pigments, such as surface-modified pigments. The surface modification may be via either an anionic group, a cationic group or direct modification of the pigment surface. Typical surface-modifying groups are carboxylate and sulfonate groups. However, other surface-modifying groups may also be used, such as anionic phosphate groups or cationic ammonium groups.

Specific examples of suitable aqueous surface-modified pigment dispersions are Sensijet® Black SDP 2000 (available from Sensient Colors Inc.) and CAB-O-JET® 200, 300, 250C, 260M and 270Y (available from Cabot Corporation).

The average particle size of pigment particles in inkjet inks is optionally in the range of 50 to 500 nm.

Pigments and dyes may be used in inkjet inks either individually or as a combination of two or more thereof.

Ink Vehicle

Ink vehicles for inkjet inks will be well known to the person skilled in the art and the ink vehicles used in the present invention are not particularly limited. The ink vehicles used in the present invention are typically conventional aqueous ink vehicles comprising at least 40 wt % water, at least 50 wt % water or at least 60 wt % water. Usually, the amount of water present in the inkjet ink is in the range of 50 wt % to 90 wt %, or optionally in the range of 60 wt % to 80 wt %.

Aqueous inkjet inks compositions are well known in the literature and, in addition to water, may comprise other components, such as co-solvents (including humectants, penetrants, wetting agents etc.), surfactants, biocides, sequestering agents, pH adjusters, viscosity modifiers, etc.

Co-solvents are typically water-soluble organic solvents. Suitable water-soluble organic solvents include $C_{1-4}$ alkyl alcohols, such as ethanol, methanol, butanol, propanol, and 2-propanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether; formamide, acetamide, dimethyl sulfoxide, sorbitol, sorbitan, glycerol monoacetate, glycerol diacetate, glycerol triacetate, and sulfolane; or combinations thereof.

Other useful water-soluble organic solvents, which may be used as co-solvents, include polar solvents, such as 2-pyrrolidone, N-methylpyrrolidone, ϵ-caprolactam, dimethyl sulfoxide, sulfolane, morpholine, N-ethylmorpholine, 1,3-dimethyl-2-imidazolidinone and combinations thereof.

The inkjet ink may contain a high-boiling water-soluble organic solvent as a co-solvent, which can serve as a wetting agent or humectant for imparting water retentivity and wetting properties to the ink composition. Such a high-boiling water-soluble organic solvent includes one having a boiling point of 180° C. or higher. Examples of the water-soluble organic solvent having a boiling point of 180° C. or higher are ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerol, trimethylolpropane, erythritol, pentaerythritol and combinations thereof.

Other suitable wetting agents or humectants include saccharides (including monosaccharides, oligosaccharides and polysaccharides) and derivatives thereof (e.g. maltitol, sorbitol, xylitol, hyaluronic salts, aldonic acids, uronic acids etc.).

The inkjet ink may also contain a penetrant, as one of the co-solvents, for accelerating penetration of the aqueous ink into the recording medium. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Examples of suitable 1,2-alkyldiols are 1,2-pentanediol and 1,2-hexanediol. The penetrant may also be selected from straight-chain hydrocarbon diols, such as 1,3-propanediol, 1,4-butanediol, 1,5-pentanediol, 1,6-hexanediol, 1,7-heptanediol, and 1,8-octanediol. Glycerol may also be used as a penetrant.

Typically, the amount of co-solvent present in the ink is in the range of about 5 wt % to 50 wt %, or optionally 10 wt % to 40 wt %.

The inkjet ink may also contain one or more surface active agents ("surfactant"), such as an anionic surface active agent, a zwitterionic surface active agent, a nonionic surface active agent or mixtures thereof. Useful anionic surface active agents include sulfonic acid types, such as alkanesulfonic acid salts, α-olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, such as alkylphosphoric ester salts, polyoxyethylene alkyl ether phosphoric ester salts, and glycerophosphoric ester salts. Specific examples of the anionic surface active agents are sodium dodecylbenzenesulfonate, sodium laurate, and a polyoxyethylene alkyl ether sulfate ammonium salt.

Examples of zwitterionic surface active agents include N,N-dimethyl-N-octyl amine oxide, N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide and N,N-dimethyl-N—(Z-9-octadecenyl)-N-amine oxide.

Examples of nonionic surface active agents include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerol alkyl esters, sorbitan alkyl esters, and sugar alkyl esters; polyether types, such as polyhydric alcohol alkyl ethers; and alkanolamide types, such as alkanolamine fatty acid amides. Specific examples of nonionic surface active agents are ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, and polyoxyalkylene alkyl ethers (e.g. polyoxyethylene alkyl ethers); and esters, such as polyoxyethylene oleate, polyoxyethylene oleate ester, polyoxyethylene distearate, sorbitan laurate, sorbitan monostearate, sorbitan mono-oleate, sorbitan sesquioleate, polyoxyethylene mono-oleate, and polyoxyethylene stearate.

Acetylene glycol surface active agents, such as 2,4,7,9-tetramethyl-5-decyne-4,7-diol; ethoxylated 2,4,7,9-tetramethyl-5-decyne-4,7-diol; 3,6-dimethyl-4-octyne-3,6-diol or 3,5-dimethyl-1-hexyn-3-ol, may also be used. Specific examples of nonionic surfactants, which may be used in the present invention, are Surfynol® 465 and Surfynol® 440 (available from Air Products and Chemicals, Inc).

The surfactant(s) are typically present in the aqueous inkjet ink in an amount ranging from 0.05 wt % to 2 wt %.

The aqueous inkjet ink may also include a pH adjuster or buffer, such as sodium hydroxide, potassium hydroxide, lithium hydroxide, sodium carbonate, sodium hydrogencarbonate, potassium carbonate, potassium hydrogencarbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogentartrate; ammonia; and amines, such as methylamine, ethylamine, diethylamine, trimethylamine, triethylamine, tris(hydroxymethyl)aminomethane hydrochloride, triethanolamine, diethanolamine, diethylethanolamine, triisopropanolamine, butyldiethanolamine, morpholine, propanolamine, 4-morpholineethanesulfonic acid and 4-morpholinepropanesulfonic acid ("MOPS"). The amount of pH adjuster, when present, is typically in the range of from 0.01 to 2 wt. % or 0.05 to 1 wt. %.

The aqueous inkjet ink may also include a biocide, such as benzoic acid, dichlorophene, hexachlorophene, sorbic acid, hydroxybenzoic esters, sodium dehydroacetate, 1,2-benthiazolin-3-one ("Proxel® GXL", available from Arch Chemicals, Inc.), 3,4-isothiazolin-3-one or 4,4-dimethyloxazolidine. The amount of biocide, when present, is typically in the range of from 0.01 to 2 wt. % or 0.05 to 1 wt. %.

The aqueous inkjet ink may also contain a sequestering agent, such as ethylenediaminetetraacetic acid (EDTA).

Inkjet Printheads

The inks according to the present invention are primarily for use in connection with thermal inkjet printheads, although they may be used in other types of printhead, especially those where an actuator contacts the ink. For the sake of completeness, there now follows a brief description of one of the Applicant's thermal inkjet printheads, as described in U.S. Pat. No. 7,303,930, the contents of which is herein incorporated by reference.

Figure 2:
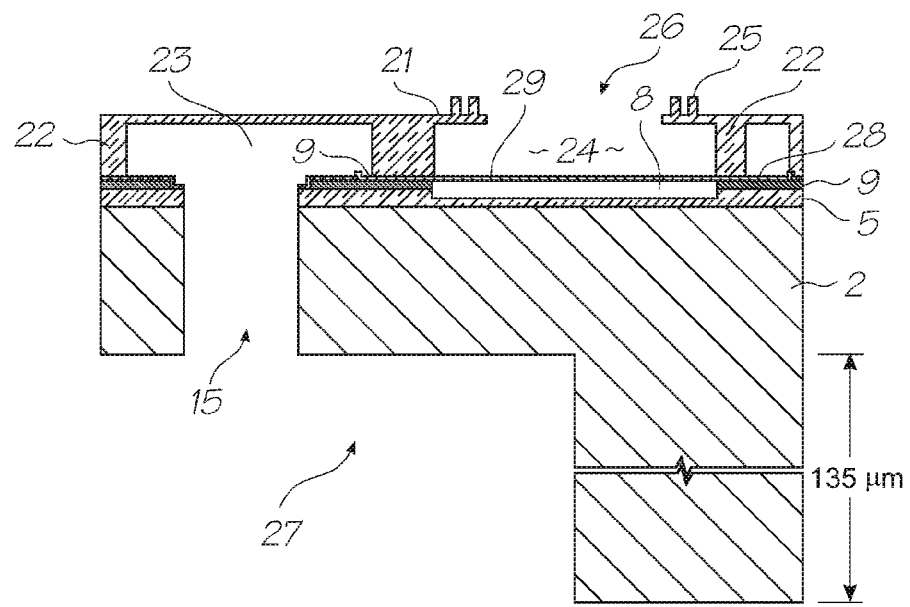
FIG. 2 is a side view of one of the nozzle assemblies shown in FIG. 1.
Figure 3:
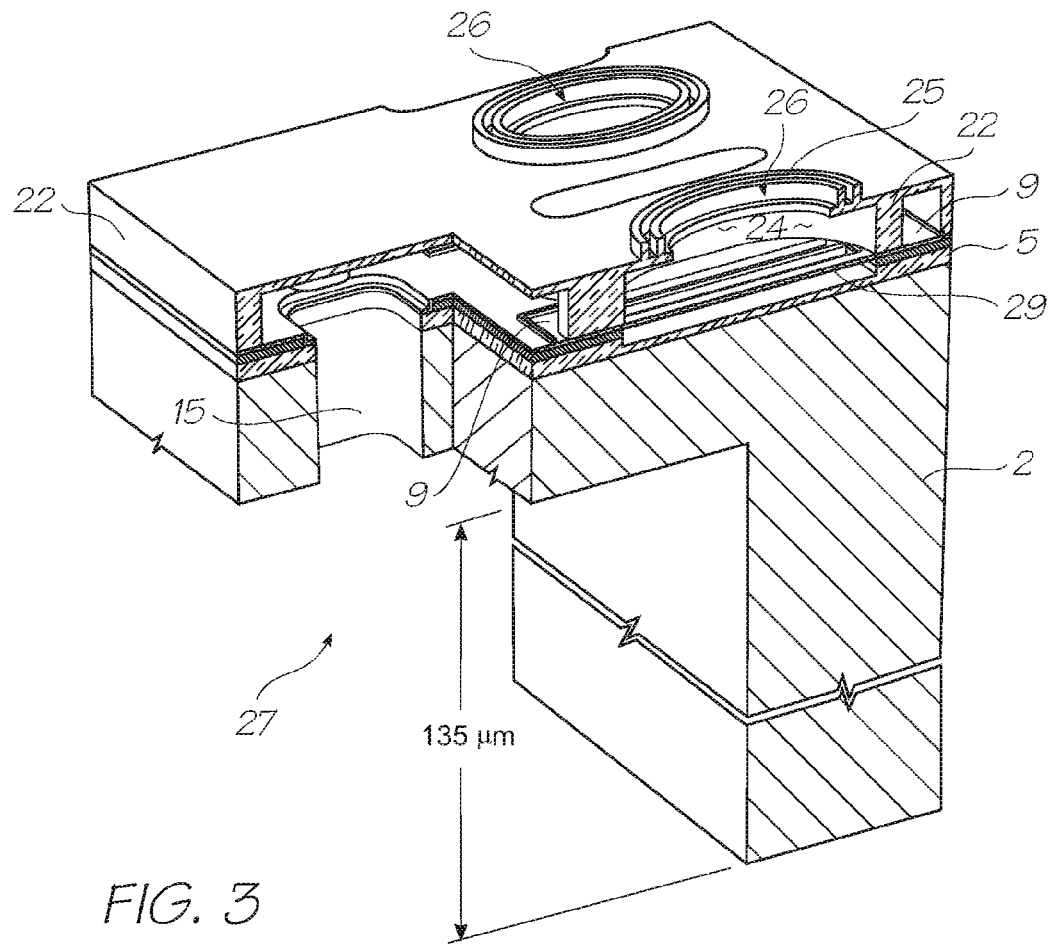
FIG. 3 is a perspective of the nozzle assembly shown in FIG. 2.

Referring to FIG. 1, there is shown part of printhead comprising a plurality of nozzle assemblies. FIGS. 2 and 3 show one of these nozzle assemblies in side-section and cutaway perspective views.

Each nozzle assembly comprises a nozzle chamber 24 formed by MEMS fabrication techniques on a silicon wafer substrate 2. The nozzle chamber 24 is defined by a roof 21 and sidewalls 22 which extend from the roof 21 to the silicon substrate 2. As shown in FIG. 1, each roof is defined by part of a nozzle plate 56, which spans across an ejection face of the printhead. The nozzle plate 56 and sidewalls 22 are formed of the same material, which is deposited by PECVD over a sacrificial scaffold of photoresist during MEMS fabrication. Typically, the nozzle plate 56 and sidewalls 21 are formed of a ceramic material, such as silicon dioxide or silicon nitride. These hard materials have excellent properties for printhead robustness, and their inherently hydrophilic nature is advantageous for supplying ink to the nozzle chambers 24 by capillary action.

Returning to the details of the nozzle chamber 24, it will be seen that a nozzle opening 26 is defined in a roof of each nozzle chamber 24. Each nozzle opening 26 is generally elliptical and has an associated nozzle rim 25. The nozzle rim 25 assists with drop directionality during printing as well as reducing, at least to some extent, ink flooding from the nozzle opening 26. The actuator for ejecting ink from the nozzle chamber 24 is a heater element 29 positioned beneath the nozzle opening 26 and suspended across a pit 8. Current is supplied to the heater element 29 via electrodes 9 connected to drive circuitry in underlying CMOS layers of the substrate 2. When a current is passed through the heater element 29, it rapidly superheats surrounding ink to form a gas bubble, which forces ink through the nozzle opening 26. By suspending the heater element 29, it is completely immersed in ink when the nozzle chamber 24 is primed. This improves printhead efficiency, because less heat dissipates into the underlying substrate 2 and more input energy is used to generate a bubble. Typically, the heater element is comprised of a metal or a conductive ceramic material. Examples of suitable materials include titanium nitride, titanium aluminium nitride and titanium-aluminium alloy.

As seen most clearly in FIG. 1, the nozzles are arranged in rows and an ink supply channel 27 extending longitudinally along the row supplies ink to each nozzle in the row. The ink supply channel 27 delivers ink to an ink inlet passage 15 for each nozzle, which supplies ink from the side of the nozzle opening 26 via an ink conduit 23 in the nozzle chamber 24.

A MEMS fabrication process for manufacturing such printheads is described in detail in U.S. Pat. No. 7,303,930, the contents of which are herein incorporated by reference.

The operation of printheads having suspended heater elements is described in detail in the Applicant's U.S. Pat. No. 7,278,717, the contents of which are incorporated herein by reference.

The Applicant has also described thermal bubble-forming inkjet printheads having embedded heater elements. Such printheads are described in, for example, U.S. Pat. No. 7,246,876 and US 2006/0250453, the contents of which are herein incorporated by reference.

The inkjet inks of the present invention function optimally in combination with the Applicant's thermal inkjet printheads, as described above. However, their use is not limited to the Applicant's thermal printheads. The inks described herein may be used in other types of thermal bubble-forming inkjet printheads, piezoelectric printheads, thermal-bend actuated printheads (as described in, for example, U.S. Pat. No. 7,926,915; U.S. Pat. No. 7,669,967; and US 2011/0050806, the contents of which are incorporated herein by reference) etc.

For the sake of completeness, inkjet printers incorporating the Applicant's thermal inkjet printheads are described in, for example, U.S. Pat. No. 7,201,468; U.S. Pat. No. 7,360,861; U.S. Pat. No. 7,380,910; and U.S. Pat. No. 7,357,496, the contents of each of which are herein incorporated by reference.

Figure 4:
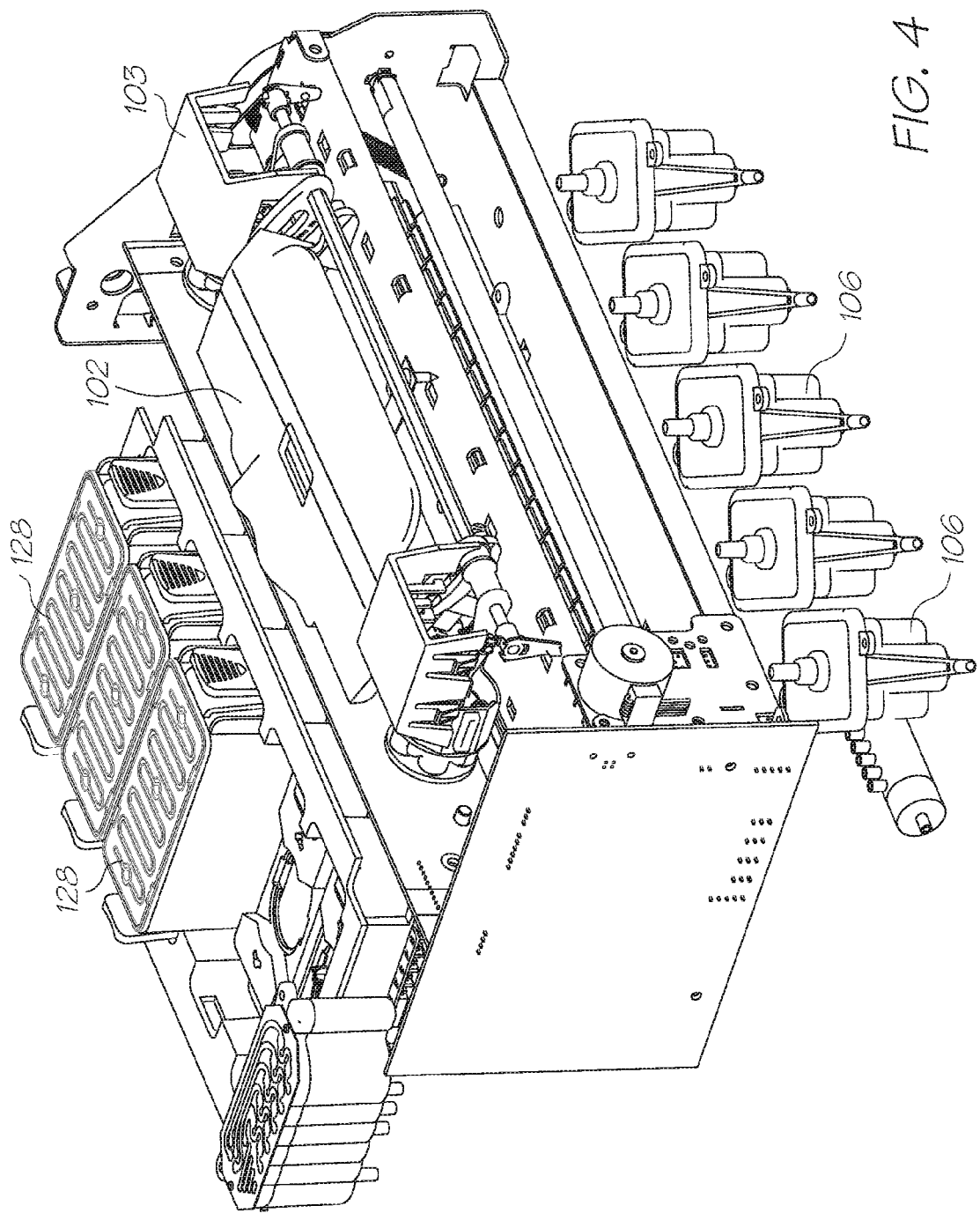
FIG. 4 is perspective view of a thermal inkjet print engine.

FIG. 4 shows a print engine 103 for a thermal inkjet printer, as described in Applicant's U.S. Pat. No. 8,066,359, the contents of which is herein incorporated by reference.

The print engine 103 includes a removable print cartridge 102, comprising a pagewidth printhead, and a bank of user-replaceable ink cartridges 128. Each color channel typically has its own ink reservoir 128 and a corresponding pressure-regulating chamber 106 for regulation of a hydrostatic pressure of ink supplied to the printhead. Hence, the print engine 103 has five ink reservoirs 128 and five corresponding pressure-regulating chambers 106. Typically, the ink channels ("color channels") employed in this five-channel print engine 103 are $CMYK_1K_2$. The ink channel order may be arranged so as to optimize preferred ink color mixing effects at the nozzle plate of the printhead, as described in US2013/0070024, the contents of which are herein incorporated by reference. For example, an ink channel order of $CK_1MK_2Y$ may be employed where cyan (C) is positioned furthest upstream and yellow (Y) is positioned furthest downstream.

Each ink cartridge 128 may comprise an ink composition as described herein. Although fluidic connections between the various components are not shown in FIG. 4, it will be appreciated that these connections are made with suitable hoses in accordance with the fluidics system described in, for example, U.S. Pat. No. 8,066,359, the contents of which are incorporated herein by reference.

Experimental Section

Accelerated printhead lifetime tests were conducted in accordance with the method described below.

Printhead integrated circuits (PHICs) having uncoated titanium aluminium nitride resistive heater elements were mounted individually for operation in a modified printing rig. Actuation pulse widths were controlled to replicate operation in an otherwise unmodified printer. In this configuration resistance change of the heater elements, as a function of the number of actuations, was measured and correlated with print quality over lifetime. Resistance rise of the heaters as a measure of heater lifetime (expressed in Ohms) was recorded after 50 million actuations. It was observed that the greater the resistance increase, the shorter the heater lifetime and the poorer the print quality. Hence, minimal resistive increases were desirable and indicate longer printhead lifetimes.

Inks were formulated as described in Table 1 and filtered (0.2 microns) prior to use.

TABLE 1

Ink formulations for accelerated printhead lifetime tests

| | Ink 1 | Ink 2 | Ink 3 | Ink 4 | Ink 5 | Ink 6 | Ink 7 | Ink 8 |
|---|---|---|---|---|---|---|---|---|
| Ethylene glycol | 9.00 | 8.59 | 6.95 | 4.90 | 0.81 | 9.0 | 9.0 | 9.0 |
| DEG[1] | 4.00 | 3.81 | 3.09 | 2.18 | 0.36 | 4.00 | 4.00 | 4.00 |
| 2-Pyrrolidinone | 7.00 | 6.68 | 5.40 | 3.81 | 0.64 | 7.00 | 7.00 | 7.00 |
| Glycerol | 2.00 | 1.90 | 1.54 | 1.09 | 0.18 | 2.00 | 2.00 | 2.00 |
| Food Black 2 Na/K salt | 7.00 | 7.00 | 7.00 | 7.00 | 7.00 | 7.00 | 7.00 | 7.00 |
| MOPS[2] | 0.40 | 0.40 | 0.40 | 0.40 | 0.40 | 0.40 | 0.40 | 0.40 |
| Surfynol ® 465[3] | 0.20 | 0.20 | 0.20 | 0.20 | 0.20 | 0.20 | 0.20 | 0.20 |
| Proxel ® GXL | 0.40 | 0.40 | 0.40 | 0.40 | 0.40 | 0.40 | 0.40 | 0.40 |
| Butoxyne™ 497[4] | | 1.00 | 5.00 | 10.00 | 20.00 | | | |
| 1-Hexyne-3-ol | | | | | | 1.00 | | |
| Surfynol ® 61[5] | | | | | | | 1.00 | |
| 1,4-Butynediol | | | | | | | | 1.00 |

[1]DEG is diethylene glycol
[2]MOPS is 3-(N-morpholino)propanesulfonic acid
[3]Surfynol ® 465 is ethoxylated 2,4,7,9-tetramethyl-5-decyne-4,7-diol
[4]Butoxyne ® 497 (Ashlands) was typically used as a source of ethoxylated butynediol in Inks 2-5. Other sources of ethoxylated butynediol were also tested, with and without the addition of ascorbic acid. All sources of ethoxylated butynediol showed similar improvements to Butoxyne ® 497 when spiked with ascorbic acid.
[5]Surfynol ® 61 is 3,5-dimethyl 1-hexyn-3-ol Inks 1-8 were tested in the modified printing rig described above and the resistance rise for each ink measured after 50 million ejections. The results from these accelerated printhead lifetime tests are shown in Table 2.

TABLE 2

Accelerated printhead lifetime test results

| Tested Ink | Resistance rise after 50 million ejections/Ohms |
|---|---|
| Ink 1 | 5.89 |
| Ink 2 | 2.00 |
| Ink 3 | 0.79 |
| Ink 4 | 0.69 |
| Ink 5 | 0.64 |
| Ink 6 | 8.58 |
| Ink 7 | 7.20 |
| Ink 8 | 6.17 |

From Table 2, it can be seen that inks comprising ethoxylated butynediol (Inks 2-5) had surprising efficacy in prolonging printhead lifetimes, as indicated by relatively small resistance rises compared to the reference Ink 1. Furthermore, this effect was not observed in other additives having non-ethoxylated acetylenic moieties. Indeed, Inks 6-8 performed worse than the reference Ink 1. It was therefore concluded that ethoxylation of alcoholic acetylenic compounds was necessary for providing consistent improvements in printhead lifetime. Notably, spiking Ink 1 with 1% ethoxylated butynediol generated about a threefold improvement in printhead lifetime.

It will, of course, be appreciated that the present invention has been described by way of example only and that modifications of detail may be made within the scope of the invention, which is defined in the accompanying claims.

The invention claimed is:

1. A method of ejecting a fluid from an inkjet nozzle device having a thermal actuator, the method comprising the steps of:

supplying the fluid to the inkjet nozzle device, the fluid comprising an acetylenic compound of formula (A):

$$R^1-C\equiv C-(CH_2)_m CH(R)-(OCH_2R^3)_n-OH \quad (A);\text{ and}$$

repeatedly actuating the thermal actuator so as to eject fluid droplets from a nozzle opening of the inkjet nozzle device, wherein:

$R^1$ is selected from the group consisting of: H, $C_{1-3}$ alkyl; and $-(CH_2)_p CH(R^4)(R^5)$;

$R^2$ is selected from the group consisting of: H and $C_{1-3}$ alkyl;

$R^3$ is selected from the group consisting of: $-CH_2-$ and $-CH(CH_3)-$;

$R^4$ is selected from the group consisting of: H and $C_{1-3}$ alkyl;

$R^5$ is selected from the group consisting of: $-OH$ and $-(OCH_2R^3)q$-OH;

m is 0, 1, 2 or 3;

n is 1 to 50;

p is 0, 1, 2 or 3; and q is 1 to 50, and wherein:

the acetylenic compound is present in an amount sufficient to increase a lifetime of the inkjet nozzle device; and the acetylenic compound is not a wetting agent.

2. The method of claim 1, wherein the fluid comprises at least 0.5 wt. % and less than 5 wt. % of the acetylenic compound.

3. The method of claim 2, wherein the fluid comprises at least 1 wt. % of the acetylenic compound.

4. The method of claim 2, wherein the fluid comprises less than 2.5 wt. % of the acetylenic compound.

5. The method of claim 1, wherein each actuator comprises a resistive heater element.

6. The method of claim 5, wherein the heater element is uncoated.

7. The method of claim 5, wherein the heater element is comprised of a metal or a conductive ceramic material.

8. The method of claim 5, wherein the heater element is comprised of a material selected from the group consisting of:

a titanium alloy;

titanium nitride; and a nitride of a titanium alloy.

9. The method of claim 1, wherein the acetylenic compound is of formula (B):

$$R^6-C\equiv C-(CH_2)(OCH_2CH_2)OH \quad (B)$$

wherein:

$R^6$ is selected from the group consisting of: $-CH_2OH$ and $-CH_2(OCH_2CH_2)-OH$.

10. The method of claim 1, wherein the acetylenic compound increases the lifetime relative to the inkjet nozzle device ejecting an otherwise identical fluid absent the acetylenic compound.

* * * * *